United States Patent
Shah et al.

(10) Patent No.: US 11,170,459 B2
(45) Date of Patent: Nov. 9, 2021

(54) SYSTEMS AND METHODS FOR SEAT SELECTION IN A VEHICLE OF A RIDE SERVICE

(71) Applicant: Ford Global Technologies, LLC, Dearborn, MI (US)

(72) Inventors: Romil Shah, Santa Clara, CA (US); Sakthi Narayanan Balasubramanian, Chennai (IN)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 16/353,933

(22) Filed: Mar. 14, 2019

(65) Prior Publication Data
US 2020/0294173 A1    Sep. 17, 2020

(51) Int. Cl.
| | |
|---|---|
| *G06Q 50/30* | (2012.01) |
| *B60R 25/01* | (2013.01) |
| *G06K 9/00* | (2006.01) |
| *G06Q 10/02* | (2012.01) |
| *H04N 7/18* | (2006.01) |
| *G01C 21/34* | (2006.01) |

(52) U.S. Cl.
CPC .......... *G06Q 50/30* (2013.01); *B60R 25/01* (2013.01); *G06K 9/00838* (2013.01); *G06Q 10/02* (2013.01); *G01C 21/3438* (2013.01); *H04N 7/183* (2013.01)

(58) Field of Classification Search
CPC .... G06Q 50/30; G01C 21/3438; H04N 7/183; H04N 7/188; G06K 9/00838
See application file for complete search history.

(56) References Cited

U.S. PATENT DOCUMENTS

| | | | |
|---|---|---|---|
| 8,587,446 B2 * | 11/2013 | Hefferon | G08B 5/221 340/679 |
| 9,952,600 B2 | 4/2018 | Gurin | |
| 2018/0039917 A1 * | 2/2018 | Buttolo | G06Q 10/0631 |
| 2018/0197114 A1 * | 7/2018 | Chen | G06Q 10/02 |
| 2018/0218470 A1 | 8/2018 | Belwafa et al. | |
| 2018/0275648 A1 * | 9/2018 | Ramalingam | G01C 21/3423 |

(Continued)

FOREIGN PATENT DOCUMENTS

| | | |
|---|---|---|
| JP | 2005-018697 A | 1/2005 |
| WO | 2018/030987 A1 | 2/2018 |

*Primary Examiner* — Jeff Zimmerman
*Assistant Examiner* — Tayar M Kyu
(74) *Attorney, Agent, or Firm* — Brandon Hicks; Eversheds Sutherland (US) LLP

(57) ABSTRACT

Exemplary embodiments described in this disclosure are generally directed to systems and methods for receiving a ride request from a user of a user device and utilizing an imaging system located in a vehicle of a ride service to capture an image of a seating area of the vehicle. The image is processed by a processor to identify a seat occupancy status and generate a seat availability diagram based on the seat occupancy status. The seat availability diagram is transmitted to the user device, and the user is prompted to either select a seat by using the seat availability diagram or to allow the system to assign any seat in the vehicle. If a seat selection is made, the system responds by reserving the selected seat and may further provide instructions to the user for entering the vehicle through a specific door located closest to the selected seat.

21 Claims, 5 Drawing Sheets

(56) References Cited

U.S. PATENT DOCUMENTS

| | | | |
|---|---|---|---|
| 2019/0072978 A1* | 3/2019 | Levi | G06N 3/084 |
| 2020/0043030 A1* | 2/2020 | Mangai | G06K 9/00832 |
| 2020/0249042 A1* | 8/2020 | Warr | H04W 4/023 |

* cited by examiner

SYSTEMS AND METHODS FOR SEAT SELECTION IN A VEHICLE OF A RIDE SERVICE

FIELD OF THE DISCLOSURE

This disclosure generally relates to ride services, and more particularly relates to offering seat selection in a vehicle of a ride service.

BACKGROUND

Conventional ride services provided through vehicles such as taxis, shuttle buses, and limousines have been supplemented in the past few years by ride services (sometimes referred to as a transportation network company, a mobility service provider, or a ride-hailing service), such as Uber™ and Lyft™. Most of the automobiles used for providing these ride services are currently driven by human drivers. However, self-driven vehicles, often referred to as autonomous vehicles, have become the focus of a number of development efforts lately, and various ride service companies are considering the use of these vehicles for providing ride services. It is foreseeable that one or more of these ride service companies may include a fleet of vehicles that includes some vehicles driven by human drivers and other vehicles that are autonomous vehicles.

Many of the ride service companies vie with each other to offer amenities that would entice customers to use their ride services over competing services. Some of these amenities, such as complimentary newspapers, water, music, and television, may be provided by the drivers of the vehicles. However, the amenities offered in an autonomous vehicle may be different and distinct from those offered in a vehicle where a human driver is present. It is desirable that the amenities provided in either type of vehicle offer a pleasurable ride experience and attract ridership.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
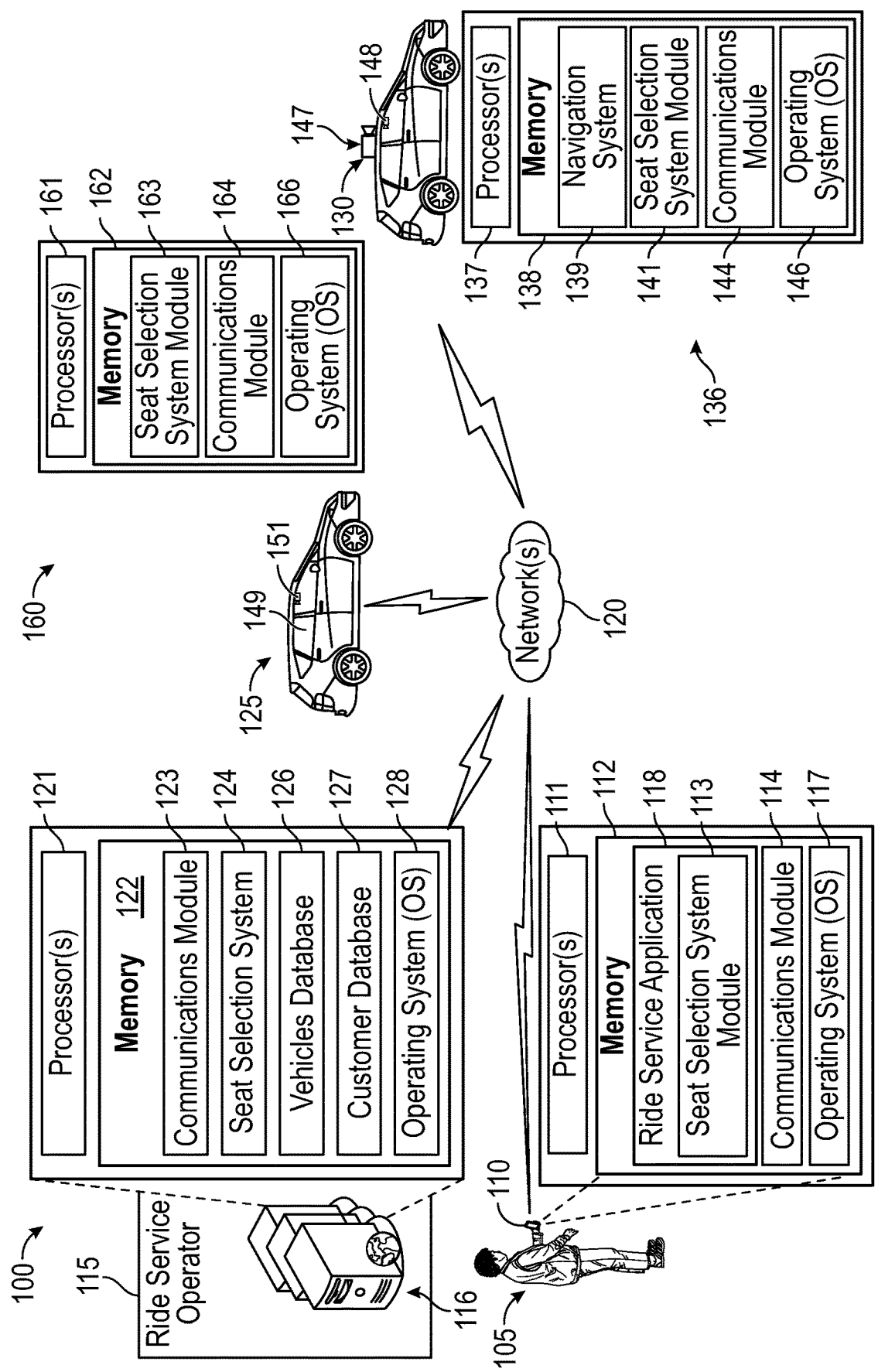
FIG. 1 shows a system that offers seat selection options to a user of a user device in accordance with an exemplary embodiment of the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, the phrase "ride service" as used herein refers to various types of transportation services such as taxi services, limousine services, shuttle services, carpool services, and rideshare services such as Uber™ and Lyft™. A "ride request" is originated by a ride customer who may be alternatively referred to herein as a "user" of a device; an "automobile" or "vehicle" of a ride service is any type of transportation, which may be autonomous or not, which is used to provide ride services; and a "driver" of an automobile is a person who uses the automobile to offer his/her driving services to customers of a ride service operator. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods for receiving a ride request from a user of a user device and utilizing an imaging system located in a vehicle of a ride service to capture at least one image of a seating area of the vehicle. The image is processed by a processor in a computer system to identify a seat occupancy status and to generate a seat availability diagram based on the seat occupancy status. The seat availability diagram is transmitted to the user device, and the user is prompted to either select a seat by using the seat availability diagram or to allow the system to assign any seat in the vehicle. If a seat selection is made, the system responds by reserving the selected seat and may further provide instructions to the user for entering the vehicle through a specific door located closest to the selected seat.

FIG. 1 shows a system 100 that offers seat selection options to a user 105 of a user device 110 in accordance with an exemplary embodiment of the disclosure. The system 100 may include a ride service operator 115 that uses a computer system 116 to provide ride services to various customers such as the user 105 of the user device 110. The computer system 116 may include several types of computers such as servers and clients that may be communicatively coupled to each other via a network 120 such as a local area network (LAN) or a wide area network (WAN). The network 120 may include any one or a combination of various networks, such as a telephone network, a cellular network, a cable network, a wireless network, and/or private/public networks such as the Internet. In some instances, the network 120 may support communication technologies such as Bluetooth, cellular, near-field communication (NFC), Wi-Fi, and/or Wi-Fi direct.

The user 105 may make a ride request to the ride service operator 115 to be picked up at a pick-up location and transported to a desired destination. The ride request may be executed in various ways, such as by placing a voice call to the ride service operator 115 or by using the user device 110 to communicate with the ride service operator 115 via the network 120. The user device 110 may be any of various types of portable devices such as a smartphone running a ride service application 118 provided by the ride service operator 115, or a laptop running an application that is customized to interact with the computer system 116 of the ride service operator 115. The user device 110 may include several components such as a processor 111 and a memory 112. The memory 112, which is one example of a non-transitory computer-readable medium, may be used to store an operating system (OS) 117 and various code modules such as a communications module 114 and the ride service application 118. The ride service application 118 includes a seat selection system module 113 that can be used by the user 105 to make a seat selection in a ride vehicle. Upon receiving the ride request, the ride service operator 115 may designate a vehicle, such an exemplary driver-operated vehicle 125 or an exemplary autonomous vehicle 130, to provide the requested ride.

One or more computers of the computer system 116 that is used by the ride service operator 115 may include several components such as a processor 121 and a memory 122. The memory 122, which is another example of a non-transitory computer-readable medium, may be used to store an operating system (OS) 128 and various other code modules such as a communications module 123, a seat selection system 124, a vehicles database 126, and a customer database 127. The communications module 123 may be used by the ride service operator 115 to communicate with the user device 110, various customers such as the user 105, and various vehicles such as the driver-operated vehicle 125 and the autonomous vehicle 130. The communications can be carried out in machine-to-machine form when the computer system 116 of the ride service operator 115 is communicating with the user device 110 of the user 105. The machine-to-machine communications may take place for example between the computer system 116 and the ride service application 118 in the user device 110 of the user 105. Communications between the computer system 116 and the user device 110 may be complemented in some cases by human-to-machine communications (voice-controlled applications), or by human-to-human communications between the ride service operator 115 and the user 105.

The communications module 123 may be used by the ride service operator 115 to communicate with the autonomous vehicle 130 and/or the driver-operated vehicle 125. The communications between the communications module 123 and a computer system 136 located in the autonomous vehicle 130, for example, may be carried out in the form of machine-to-machine communications. The machine-to-machine communications may be directed at executing various functions such as providing information and/or instructions to the autonomous vehicle 130 regarding a ride requested by the user 105, queries relating to one or more conditions of the autonomous vehicle 130, queries relating to a status of the autonomous vehicle 130, and/or for operating as an intermediary between the user 105 and the autonomous vehicle 130.

The vehicles database 126 may include various types of information relating to the various cars (autonomous and/or driver operated) in the fleet operated by the ride service operator 115. For example, the vehicles database 126 may include information pertaining to a seating capacity in the autonomous vehicle 130 or the driver-operated vehicle 125, a seating layout in the autonomous vehicle 130 or the driver-operated vehicle 125, an availability of the autonomous vehicle 130 or the driver-operated vehicle 125 for responding to a ride request, and/or suitability of the autonomous vehicle 130 or driver-operated vehicle 125 to provide service to physically impaired customers.

The customer database 127 may include various types of information relating to existing customers, new customers, and/or potential customers of the ride service provided by the ride service operator 115. For example, the customer database 127 may include information pertaining to a physical impairment of the user 105, a type of vehicle preferred by the user 105, a seating preference of the user 105, credit card information of the user 105, and/or payment history of the user 105.

Each of the autonomous vehicles that are a part of the fleet of cars operated by the ride service operator 115 includes a computer system, such as the computer system 136 in the autonomous vehicle 130. The computer system 136 may include several components such as a processor 137 and a memory 138. The memory 138, which is another example of a non-transitory computer-readable medium, may be used to store an operating system (OS) 146 and various other code modules such as a navigation system 139, a seat selection system module 141, and a communications module 144. The various code modules may be configured to cooperate with various types of hardware provided in the autonomous vehicle 130 for carrying out various operations. For example, the navigation system 139 is coupled to a sensing system 147, and the seat selection system module 141 is coupled to an imaging system 148.

The navigation system 139 may include software that cooperates with various types of hardware components mounted in the autonomous vehicle 130. A few examples of such hardware may include a sensing system 147 (video cameras, motion detectors, distance sensors, proximity sensors, audio sensors, etc.) that may be used to guide the autonomous vehicle 130 safely through traffic such as a mix of vehicles and pedestrians that may be encountered in a city. The navigation system 139 may also cooperate with route guidance equipment such as a Global Positioning System (GPS) system for guiding the autonomous vehicle 130 from a first location to a second location.

The seat selection system module 141 may include software that receives one or more images captured by the imaging system 148 and processes the images to generate a seat availability diagram. In one exemplary implementation, the imaging system 148 may incorporate computer vision. In another exemplary implementation, the seat selection system module 141 may use a deep learning model to process images provided by the imaging system 148. In yet another exemplary implementation, the seat availability diagram may be stored in cloud storage and made available for access by various computer systems through the network 120.

The imaging system 148 can include one or more cameras such as a digital camera configured to capture digital images of an interior portion of the autonomous vehicle 130 or a video camera configured to capture video footage of an interior portion of the autonomous vehicle 130. In one example implementation, a digital camera is mounted upon an interior surface of a front windshield of the autonomous vehicle 130 or on a roof portion located above the driver section of the autonomous vehicle 130 in order to capture digital images of a seating area in the autonomous vehicle 130. In another exemplary implementation, a digital camera is mounted on a pillar of the car frame of the autonomous vehicle 130 in order to capture digital images of a seating area in the autonomous vehicle 130. In yet another exemplary implementation, a single digital camera may prove inadequate to capture digital images of an entire seating area in the autonomous vehicle 130. Consequently, multiple cameras may be mounted in various locations inside the autonomous vehicle 130 so as to capture digital images of the seating area from multiple angles. The images captured by the multiple cameras may be stitched together when processed by the seat selection system module 141.

The driver-operated vehicle 125 may include a computer system 160 that includes at least some components of the computer system 136. For example, the navigation system 139 that is included in the computer system 136 may be omitted in the computer system installed in the driver-operated vehicle 125 because the driver 149 performs the navigating functions in the driver-operated vehicle 125. The computer system 160 may include components such as a processor 161 and a memory 162. The memory 162, which is another example of a non-transitory computer-readable medium, may be used to store an operating system (OS) 166 and various other code modules such as a seat selection system module 163 and a communications module 164. The code modules may be configured to cooperate with various types of hardware provided in the driver-operated vehicle 125 for carrying out various operations.

Furthermore, in an exemplary embodiment in accordance with the disclosure, the driver-operated vehicle 125 includes an imaging system 151 that may be identical or similar to the imaging system 148 installed in the autonomous vehicle 130. In a first exemplary implementation, the imaging system 151 is configured to cooperate with the seat selection system module 163 that is a part of the computer system 160 in the driver-operated vehicle 125 to execute the various seat selection operations described herein. The operations of the seat selection system module 163 may be carried out without intervention from the driver 149. In a second exemplary implementation, some functions of the seat selection system module 163 may be assisted by the driver 149. For example, the driver 149 may manually operate the imaging system 151 for initiating image capture by the imaging system 151 and/or for submitting seat occupancy information to the computer system 160.

A memory device such as the memory 112, the memory 122, the memory 138, and the memory 162 shown in FIG. 1 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electro-magnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, because the program can be electronically captured, for instance, via optical scanning of the paper or other medium, then compiled, interpreted or otherwise processed in a suitable manner if necessary, and then stored in a computer memory.

Figure 2:
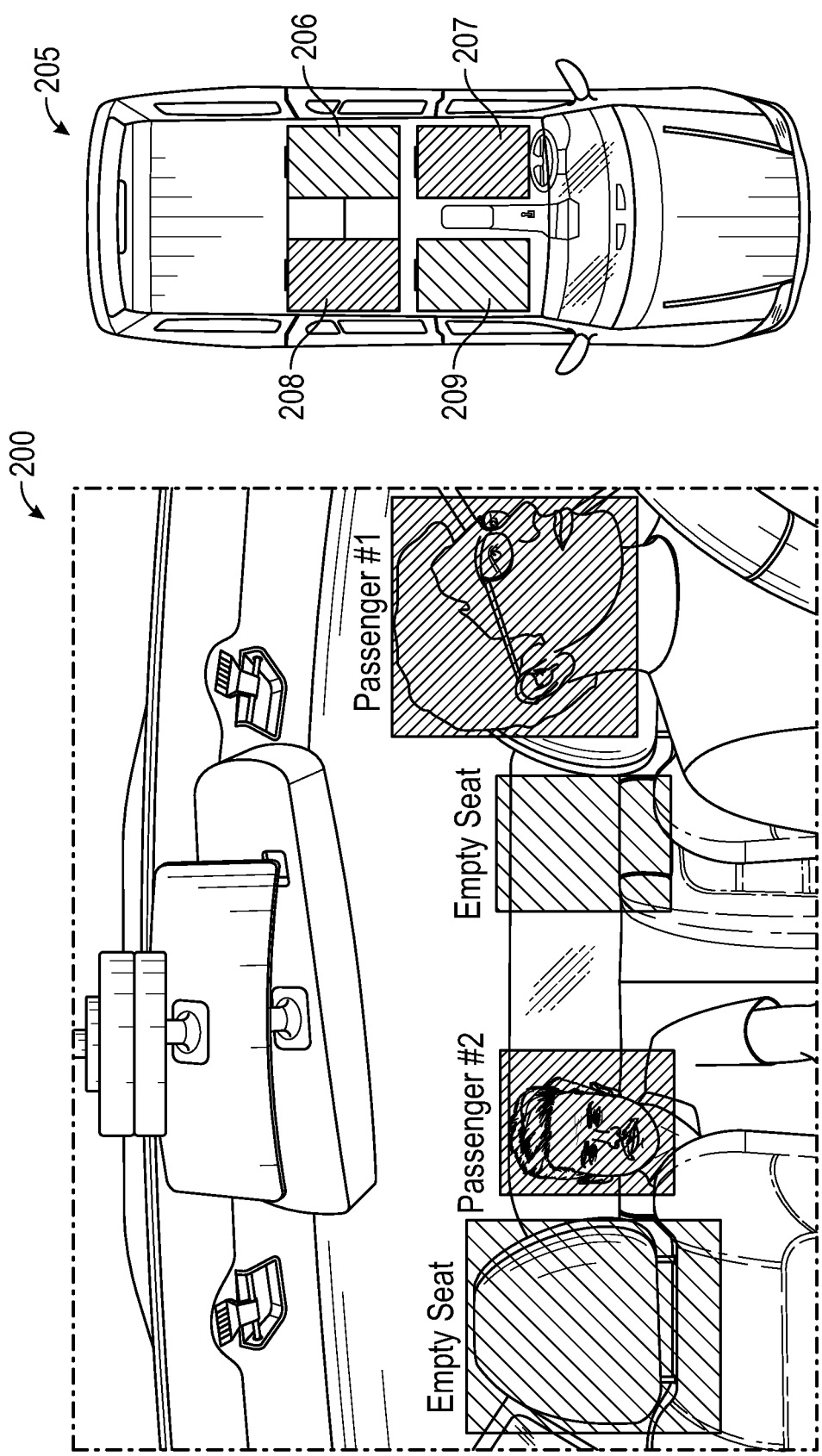
FIG. 2 shows a first exemplary image and a first exemplary seating diagram of a vehicle of a ride service in accordance with the disclosure.

FIG. 2 shows a first exemplary image 200 and a first exemplary seating diagram 205 of a vehicle of a ride service in accordance with the disclosure. The vehicle may be an autonomous vehicle such as the autonomous vehicle 130 or may be a driver-operated vehicle such as the driver-operated vehicle 125. In this example, the imaging system 151 of the driver-operated vehicle 125 is used to capture the image 200, which is then provided to the seat selection system module 163 in the computer system 160 located in the driver-operated vehicle 125. The seat selection system module 163 processes the image 200 and generates the seating diagram 205. In this example, the seating diagram 205 includes a symbolic representation to indicate that the seat 207 is currently occupied by the driver 149, and the seat 208 is currently occupied by a passenger. The symbolic representation may include a suitable color such as red, for example, to indicate a non-availability of the seat 207 and the seat 208. The seating diagram 205 includes another symbolic representation to indicate that two seats (seat 206 and seat 209) are currently unoccupied. The symbolic representation may include a suitable color such as green, for example, to indicate that each of the seat 206 and the seat 209 is unoccupied and available. In another example, one or more of the seats may be occupied by an object, such as a suitcase, a briefcase, or a package, belonging to a passenger of the vehicle. The driver 149 may suggest to one of the passengers to remove the object and make the seat available for use. If the object is removed, the driver 149 may initiate capture of another image showing the unoccupied seat. The seat selection system module 163 may process the new image and generate an updated seating diagram.

The seating diagram 205 (or the updated seating diagram) may then be transmitted by the computer system 160 to the computer system 116 and/or the user device 110. The seat selection system module 113 in the user device 110 is configured to display the seating diagram 205 on a display screen of the user device 110 and to request the user 105 to select one of two options. The first option offers the user 105 an opportunity to allow the ride service application 118 and/or the seat selection system 124 to assign any available vacant seat to the user 105. The seat assignment may be carried out by the ride service application 118 and/or the seat selection system 124 based on various factors such as a seat occupancy status of the seats in the driver-operated vehicle 125. The seat occupancy status may vary dynamically based on other users who may be seeking a ride in the driver-operated vehicle 125 and/or based on changes that the driver 149 may carry out to modify the seat occupancy status (such as requesting a passenger to move from one seat to another or requesting a passenger to remove an item of luggage from a seat). Consequently, this type of seat assignment can be flexible and adaptable.

The second option offers the user 105 an opportunity to make a seat selection. The user 105 may then select one of the unoccupied seats (seat 206 and seat 209). The occupied seats (seat 207 and seat 208) are made unavailable for selection by the user 105. The selection made by the user 105 is conveyed by the ride service application 118 to the seat selection system 124 in the computer system 116. The seat selection system 124 reserves the selected seat for occupancy by the user 105 when picked up by the driver-operated vehicle 125. The seat selection system 124 and/or the seat selection system module 113 may also provide in the seating diagram 205 a symbolic representation of an entry door located adjacent to the seat selected by the user 105. This entry door is automatically unlocked by the computer system 160 in the driver-operated vehicle 125 when the user 105 approaches the driver-operated vehicle 125 at the pick-up location provided by the user 105. The driver 149 may maneuver the driver-operated vehicle 125 such that the entry door faces a curb at the pick-up location so as to allow the user 105 to safely enter the driver-operated vehicle 125.

Figure 3:
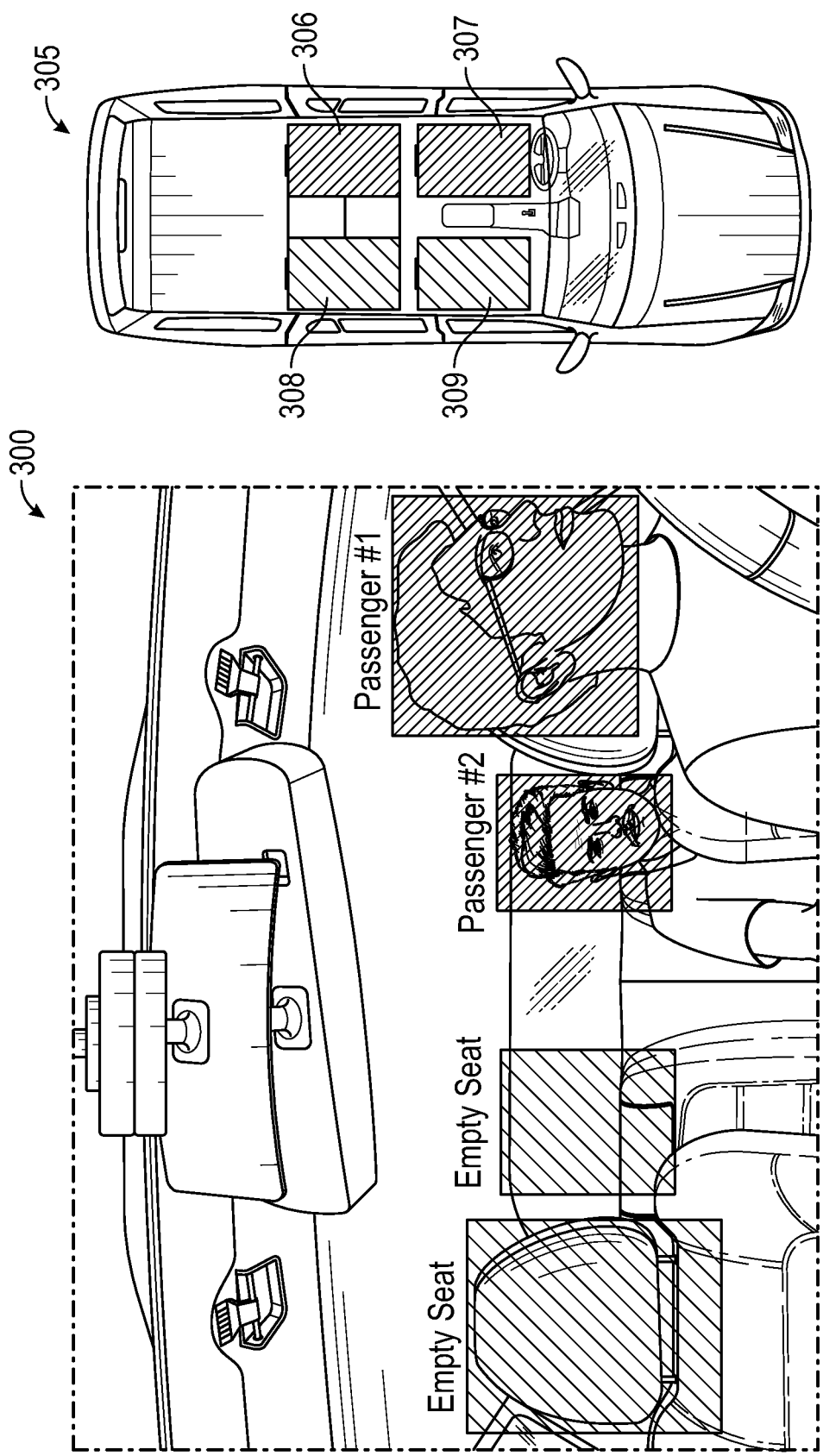
FIG. 3 shows a second exemplary image and a second exemplary seating diagram of a vehicle of a ride service in accordance with the disclosure.

FIG. 3 shows a second exemplary image 300 and a second exemplary seating diagram 305 of a vehicle of a ride service in accordance with the disclosure. In this example, the vehicle is the autonomous vehicle 130. The imaging system 148 of the autonomous vehicle 130 is used to capture the image 300, which is then provided to the seat selection system module 141 in the computer system 136 located in the autonomous vehicle 130. The seat selection system module 141 processes the image 300 and generates the seating diagram 305. In this example, the seating diagram 305 includes a symbolic representation (having a red color for example) to indicate that seat 307 is currently occupied by a first passenger and that the seat 306 is currently occupied by a second passenger. The seating diagram 305 includes another symbolic representation (having a green color for example) to indicate that two seats (seat 308 and seat 309) are currently unoccupied. In another example, one or more of the seats may be occupied by an object, such as a suitcase, a briefcase, or a package, belonging to a passenger of the vehicle. A voice announcement system (not shown) located in the autonomous vehicle 130 may be used by the computer system 136 to request the passenger to remove the object and make the seat available for use. If the object is removed, the seat selection system module 141 may initiate capture of another image showing the unoccupied seat and generate an updated seating diagram.

The seating diagram 305 (or the updated seating diagram) may then be transmitted by the computer system 136 to the computer system 116 and/or the user device 110. The seat selection system module 113 in the user device 110 is configured to display the seating diagram 305 on a display screen of the user device 110 and to request the user 105 to select one of two options. The first option offers the user 105 an opportunity to allow the seat selection system module 113 and/or the seat selection system 124 to assign any available vacant seat to the user 105. The seat assignment may be carried out by the seat selection system module 113 and/or the seat selection system 124 based on various factors such as a seat occupancy status of the seats in the autonomous vehicle 130. The seat occupancy status may vary dynamically based on other users who may be seeking a ride in the autonomous vehicle 130 and/or based on changes that the computer system 136 may carry out to modify the seat occupancy status (such as requesting a passenger to move from one seat to another or requesting a passenger to remove an item of luggage from a seat). Consequently, this type of seat assignment can be flexible and adaptable.

The second option offers the user 105 an opportunity to make a seat selection. The user 105 may then select one of the unoccupied seats (seat 308 and seat 309). The occupied seats (seat 306 and seat 307) are made unavailable for selection by the user 105. The selection made by the user 105 is conveyed by the ride service application 118 to the seat selection system 124 in the computer system 116. The seat selection system 124 reserves the selected seat for occupancy by the user 105 when picked up by the autonomous vehicle 130. The seat selection system 124 and/or the seat selection system module 113 may also provide in the seating diagram 305 a symbolic representation of an entry door located adjacent to the seat selected by the user 105. This entry door is automatically unlocked by the computer system 136 in the autonomous vehicle 130 when the user 105 approaches the autonomous vehicle 130 at the pick-up location provided by the user 105. The computer system 136 may maneuver the autonomous vehicle 130 such that the entry door faces a curb at the pick-up location so as to allow the user 105 to safely enter the autonomous vehicle 130.

Figure 4:
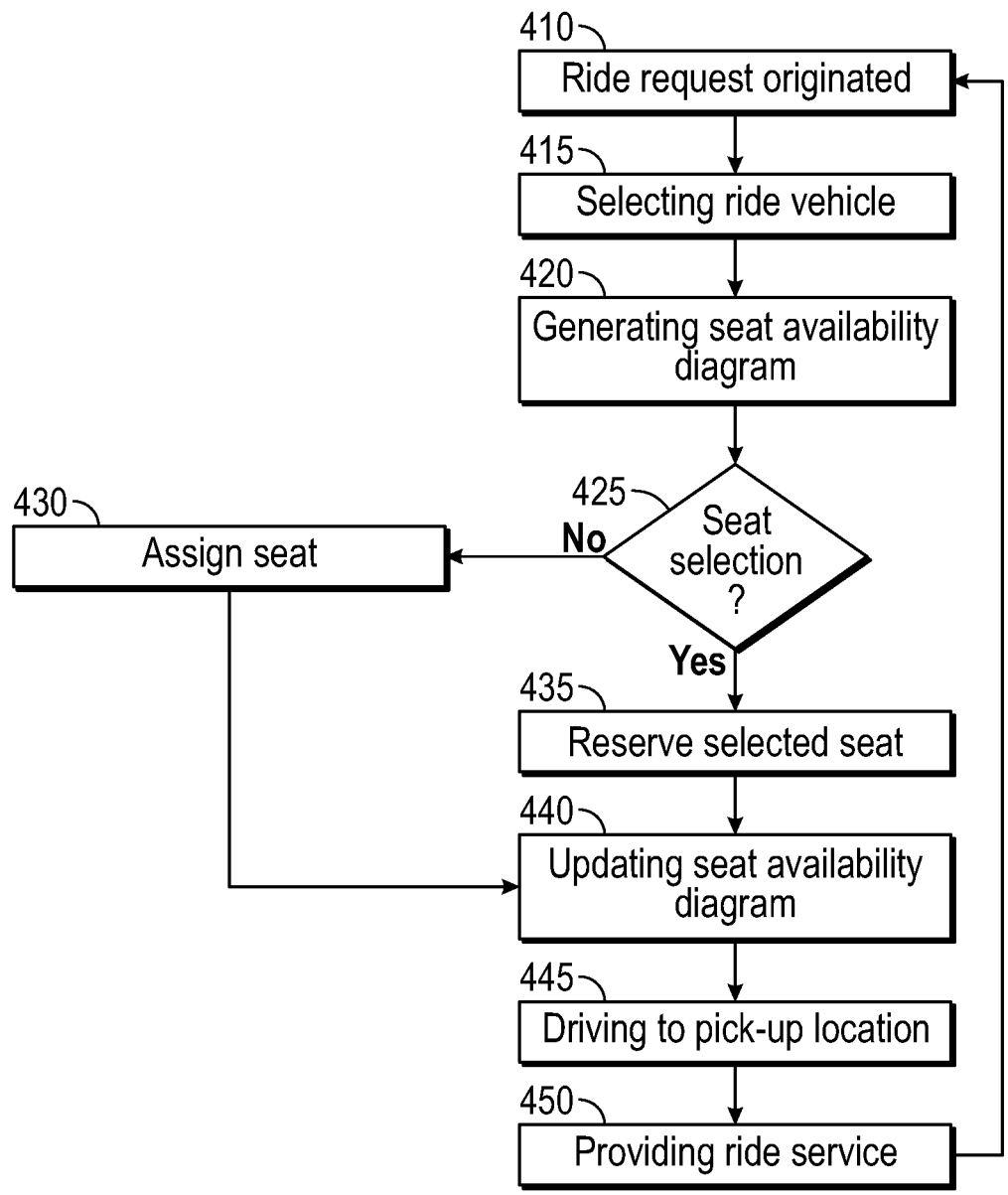
FIG. 4 shows a flowchart that illustrates an exemplary method for providing a seat selection in a vehicle of a ride service in accordance with an embodiment of the disclosure.

FIG. 4 shows a flowchart 400 that illustrates an exemplary method for providing a seat selection in a vehicle of a ride service in accordance with an embodiment of the disclosure. The flowchart 400, as well as other flowcharts disclosed herein, illustrate a sequence of operations that can be implemented in hardware, software, or a combination thereof. In the context of software, the operations represent computer-executable instructions stored on one or more non-transitory computer-readable media such as the memory 122, the memory 112, the memory 162, and/or the memory 138 that, when executed by one or more processors such as the processor 121, the processor 111, the processor 161, and/or the processor 137, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 410, a ride request may be originated by the user 105 on the user device 110. The request may be transmitted by the user device 110, through the network 120, to the computer system 116 of the ride service operator 115. At block 415, the processor 121 of the computer system 116 may make a determination as to which vehicle should be used to respond to the ride request. In one exemplary implementation, the processor 121 may make the determination by evaluating one or more entries in the vehicles database 126. The evaluation may be based on various factors such as a seating capacity of the vehicle, a seating layout in the vehicle, an availability of the vehicle for responding to a ride request, and/or the suitability of the vehicle to provide service to physically impaired customers (wheelchair ramp, wheelchair lift, etc.). In another exemplary implementation, the processor 121 may make the determination by accessing a third-party database (not shown) through the network 120. In yet another exemplary implementation, the processor 121 may make the determination by communicating with one or more computer systems such as the computer system 160 of the driver-operated vehicle 125 and the computer system 136 of the autonomous vehicle 130 to obtain information. The vehicle (for example, the autonomous vehicle 130 or the driver-operated vehicle 125) sends the vehicle information to the computer system 116.

At block 420, the seat selection system 124 and/or the seat selection system module 113 may generate a seat availability diagram and provide the seat availability diagram to the user device 110 of the user 105. In one exemplary implementation, the seat availability diagram may be generated by using a seat arrangement template that is obtained from cloud storage through the network 120. At block 425, a request is made to the user 105 to provide an indication of whether the user 105 would like to make a seat selection or that he/she has no seating preference. If the user 105 indicates that he/she has no seating preference, at block 430, the seat selection system 124 assigns a seat to the user 105. If the user 105 makes a seat selection, at block 435, the seat selection system module 113 and/or the seat selection system 124 reserves the selected seat.

At block 440, the seat selection system module 113 and/or the seat selection system 124 modifies the seat availability diagram to update an occupancy status of the assigned seat or the reserved seat from available to occupied. Modifying the seat availability diagram may further include providing a symbolic representation of a specific entry door to be used by the user 105 for entering the vehicle. At block 445, the vehicle drives to a pick-up location provided by the user 105 from the user device 110. Upon reaching the pick-up location, the computer system in the vehicle may cooperate with the seat selection system module in the computer system to unlock a door located closest to the seat that is reserved or assigned to the user 105. At block 450, the vehicle provides ride services to the user 105 from the pick-up location to a destination specified by the user 105.

Figure 5:
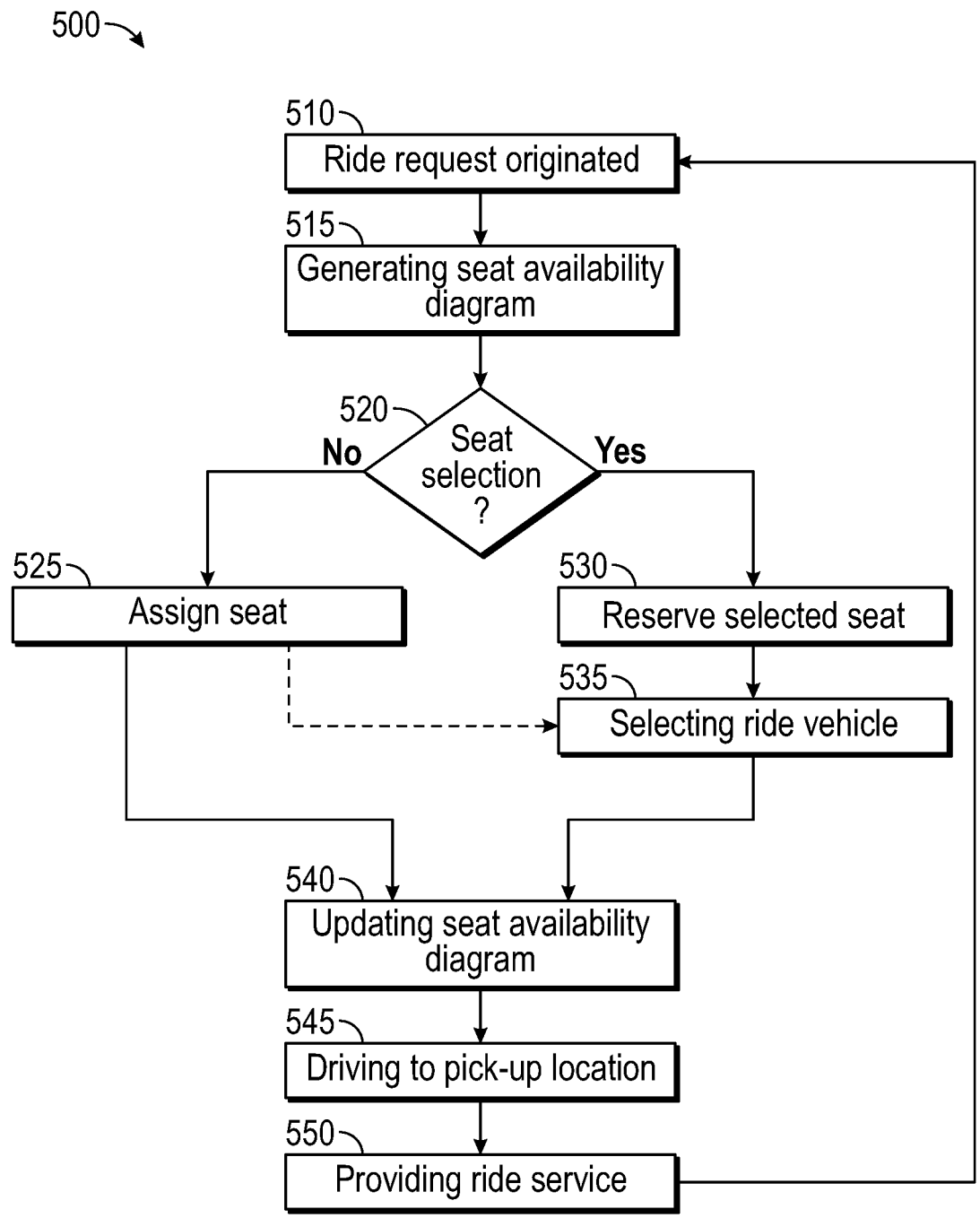
FIG. 5 shows a flowchart that illustrates another exemplary method for providing a seat selection in a vehicle of a ride service in accordance with an embodiment of the disclosure.

FIG. 5 shows a flowchart 500 that illustrates another exemplary method for providing a seat selection in a vehicle of a ride service in accordance with an embodiment of the disclosure. At block 510, a ride request may be originated by the user 105 on the user device 110. The request may be transmitted by the user device 110, through the network 120, to the computer system 116 of the ride service operator 115. At block 515, the seat selection system 124 may generate a seat availability diagram and provide the seat availability diagram to the user device 110 of the user 105. At block 520, the user 105 may make a seat selection or indicate that he/she has no seating preference. If the user 105 indicates that he/she has no seating preference, the seat selection system module 113 and/or the seat selection system 124 may assign a seat to the user 105 at block 525. If the user 105 makes a seat selection, the seat selection system module 113 and/or the seat selection system 124 reserves the selected seat at block 530.

At block 535, the processor 121 of the computer system 116 may make a determination as to which vehicle should be used to respond to the ride request. In one exemplary implementation, the processor 121 may make the determination by evaluating one or more entries in the vehicles database 126. The evaluation may be based on various factors such as a seating capacity of the vehicle, a seating layout in the vehicle, an availability of the vehicle for responding to a ride request, and/or suitability of the vehicle to provide service to physically impaired customers (wheelchair ramp, wheelchair lift, etc.). In another exemplary implementation, the processor 121 may make the determination by accessing a third-party database (not shown) through the network 120. In yet another exemplary implementation, the processor 121 may make the determination by communicating with one or more computer systems such as the computer system 160 and the computer system 136 to obtain information. The vehicle (for example, the autonomous vehicle 130 or the driver-operated vehicle 125) may send vehicle information to the computer system 116.

A dashed line between block 525 and block 535 is indicative of an alternative action wherein the determination of which vehicle should be used to respond to the ride request is made by considering the seat allocation at block 530 as well as the seat allocation at block 525. For example, a seating capacity of the vehicle may be determined based on accommodating both the reserved seating as well as the assigned seating. In one exemplary implementation, a preference may be given to users who provide a seat selection, and assigned seating may be made available only when enough seats are available for carrying out the assignment.

At block 540, the seat selection system module 113 and/or the seat selection system 124 may modify the seat availability diagram to update an occupancy status of the assigned seat from available to occupied. Modifying the seat availability diagram may further include providing a symbolic representation of a specific entry door to be used by the user 105 for entering the ride vehicle. At block 545, the vehicle travels to a pick-up location provided by the user 105 from the user device 110. Upon reaching the pick-up location, the computer system in the vehicle may cooperate with the seat selection system module in the computer system to unlock a door located closest to the seat that is reserved or assigned to the user 105. At block 550, the vehicle provides ride services to the user 105 from the pick-up location to a destination specified by the user 105.

Example Embodiments

Example 1 may include a method comprising: capturing, by an imaging system located in a vehicle, at least one image of a seating area in the vehicle; processing, by at least a first computer, the at least one image to identify a seat occupancy status of one or more seats in the vehicle; generating, by at least the first computer and based at least in part on the seat occupancy status, a seat availability diagram; receiving, by at least one of the first computer or a second computer, a request for a ride from a user device; providing, by the at least one first computer and based on the request, the seat availability diagram to the user device; and receiving, by the at least one of the first computer or the second computer, one of a first response or a second response from the user device, the first response indicating a seat selection based, at least in part, on the seat availability diagram, and the second response indicating an acceptance of any seat that is assigned by the at least one of the first computer or the second computer.

Example 2 may include the method of example 1, wherein the vehicle is an autonomous vehicle, and wherein processing the at least one image comprises: detecting an occupied seat in the autonomous vehicle; and providing, in the seat availability diagram, a first symbolic representation indicative of an unavailability of the occupied seat.

Example 3 may include the method of example 2 and/or some other example herein, further comprising: detecting an empty seat in the autonomous vehicle; and providing, in the seat availability diagram, a second symbolic representation indicative of an availability of the empty seat.

Example 4 may include the method of example 3 and/or some other example herein, further comprising: providing, in the seat availability diagram, a third symbolic representation indicative of an entry door located adjacent to the empty seat.

Example 5 may include the method of example 4 and/or some other example herein, further comprising: unlocking the entry door when the autonomous vehicle reaches a pick-up location associated with a user of the user device.

Example 6 may include the method of example 1 and/or some other example herein, wherein the seat availability diagram is generated at least in part by at least one of using computer vision to capture the at least one image or using a deep learning model to process the at least one image.

Example 7 may include the method of example 1 and/or some other example herein, wherein generating the seat availability diagram comprises: obtaining, from cloud storage, a seat arrangement template of the vehicle; and using the seat arrangement template and the seat occupancy status to generate the seat availability diagram.

Example 8 may include a system comprising: an imaging system located in a vehicle, the imaging system configured to capture at least one image of a seating area in the vehicle; at least one memory that stores computer-executable instructions; and at least one processor configured to access the at least one memory and execute the computer-executable instructions to at least: process the at least one image to identify a seat occupancy status of one or more seats in the vehicle; generate a seat availability diagram based, at least in part, on the seat occupancy status; receive, from a user device, a request for a ride; respond to the request by providing the seat availability diagram to the user device; and receive, from the user device, one of a first response or a second response, the first response indicating a seat selection based, at least in part, on the seat availability diagram, and the second response indicating an acceptance of any seat that is assigned by the at least one processor.

Example 9 may include the system of example 8 and/or some other example herein, wherein the vehicle is an autonomous vehicle, and wherein the seat occupancy status comprises one of an occupant seated in a first seat in the autonomous vehicle or an object placed upon the first seat in the autonomous vehicle.

Example 10 may include the system of example 9 and/or some other example herein, wherein the seat availability diagram includes a first symbol indicative of an unavailability of the first seat and a second symbol indicative of an availability of a second seat that is unoccupied.

Example 11 may include the system of example 10 and/or some other example herein, wherein the at least one memory includes at least one of a first memory that is located in the autonomous vehicle or a second memory that is a part of a cloud storage.

Example 12 may include the system of example 11 and/or some other example herein, wherein the second memory contains a seat arrangement template of the autonomous vehicle and the at least one processor utilizes the seat arrangement template to generate the seat availability diagram.

Example 13 may include the system of example 8 and/or some other example herein, wherein the computer-executable instructions include a deep learning model that is utilized by the at least one processor to generate the seat availability diagram.

Example 14 may include a method comprising: assigning, by at least one computer comprising one or more processors coupled to at least one memory, a seat in a vehicle, the assignment based, at least in part, on a response provided from a user device indicating one of a seating preference in the vehicle or an acceptance of any seat assigned by the at least one computer, and the response based, at least in part, on a seat availability diagram generated by processing at least one image of a seating area in the vehicle that is captured by an imaging system located in the vehicle.

Example 15 may include the method of example 14, wherein the vehicle is an autonomous vehicle, and wherein processing the at least one image of the seating area in the autonomous vehicle for generating the seat availability diagram comprises: detecting an occupied seat in the autonomous vehicle; and providing, in the seat availability diagram, a first symbolic representation indicative of an unavailability of the occupied seat.

Example 16 may include the method of example 15 and/or some other example herein, further comprising: detecting an empty seat in the autonomous vehicle; and providing, in the seat availability diagram, a second symbolic representation indicative of an availability of the empty seat.

Example 17 may include the method of example 16 and/or some other example herein, further comprising: providing, in the seat availability diagram, a third symbolic representation indicative of an entry door located adjacent to the seat assigned by the at least one computer; and providing an instruction to a user of the user device to use the entry door for entering the autonomous vehicle.

Example 18 may include the method of example 17 and/or some other example herein, further comprising: unlocking the entry door when the autonomous vehicle reaches a pick-up location associated with the user of the user device.

Example 19 may include the method of example 15 and/or some other example herein, wherein the seat availability diagram is generated at least in part by processing the at least one image using a deep learning model.

Example 20 may include the method of example 14 and/or some other example herein, wherein processing the at least one image of the seating area in the vehicle for generating the seat availability diagram comprises: obtaining, from cloud storage, a seat arrangement template of the vehicle; and using the seat arrangement template to generate the seat availability diagram.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
capturing, by an imaging system located in a vehicle, at least one image of a seating area in the vehicle;
processing, by a first computer, the at least one image to identify a seat occupancy status of one or more seats in the vehicle;
generating, by the first computer and based at least in part on the seat occupancy status, a seat availability diagram;
requesting, by the first computer, that a passenger located in a first seat within the vehicle remove an object from a second seat within the vehicle;
modifying, based on the object being removed from the second seat, the seat availability diagram to include the second seat as an unoccupied seat;
receiving, by the first computer or a second computer, a request for a ride from a first user device;
providing, by the first computer and based on the request, the seat availability diagram to the first user device;

receiving a response indicating an acceptance of any seat within the vehicle;

assigning a seat in the vehicle to the first user device; and unlocking an entry door when the vehicle reaches a pick-up location associated with a user of the first user device.

2. The method of claim 1, wherein the vehicle is an autonomous vehicle, and wherein processing the at least one image comprises:

detecting an occupied seat in the autonomous vehicle;

providing, in the seat availability diagram, a first symbolic representation indicative of an unavailability of the occupied seat;

detecting an empty seat in the autonomous vehicle; and providing, in the seat availability diagram, a second symbolic representation indicative of an availability of the empty seat.

3. The method of claim 1, further comprising:

providing, in the seat availability diagram, a third symbolic representation indicative of an entry door located adjacent to the first seat, wherein the third symbolic representation is displayed based on assigning the first seat.

4. The method of claim 1, wherein the seat availability diagram is generated at least in part by at least one of using computer vision to capture the at least one image or using a deep learning model to process the at least one image.

5. The method of claim 1, wherein generating the seat availability diagram comprises:

obtaining, from cloud storage, a seat arrangement template of the vehicle; and using the seat arrangement template and the seat occupancy status to generate the seat availability diagram.

6. The method of claim 1, further comprising:

receiving a second request for a ride from a second user device;

providing, based on the second request, a second seat availability diagram to the second user device, the second seat availability diagram including the first seat as an occupied seat;

receiving a response indicating a seat selection of the first seat by the second user device; and assigning the first seat in the vehicle to the second user device, and adjusting an assignment of the first user device to a second unoccupied seat.

7. The method of claim 1, further comprising:

capturing, by the imaging system and subsequent to requesting that the passenger located in the first seat within the vehicle remove the object from the second seat within the vehicle, a second image of the seating area in the vehicle; and determining, based on the second image, that the object is no longer located on the second seat, wherein modifying the seat availability diagram to include the second seat as an unoccupied seat is based on the determination that the object is no longer located in the second seat.

8. The method of claim 1, wherein requesting, that the passenger located in the first seat remove the object is made using a voice announcement system in the vehicle.

9. The method of claim 1, wherein providing the seat availability diagram to the first user device further comprises providing a first option for the first user device to accept any seat assignment, and a second option for the first user device to select a specific seat within the vehicle for reservation.

10. A system comprising:

an imaging system located in a vehicle, the imaging system configured to capture at least one image of a seating area in the vehicle;

at least one memory that stores computer-executable instructions; and at least one processor configured to access the at least one memory and execute the computer-executable instructions to at least:

process the at least one image to identify a seat occupancy status of one or more seats in the vehicle;

generate a seat availability diagram based, at least in part, on the seat occupancy status;

request that a passenger located in a first seat within the vehicle remove an object from a second seat within the vehicle;

modify, based on the object being removed from the second seat, the seat availability diagram to include the second seat as an unoccupied seat;

receive, from a first user device, a request for a ride;

respond to the request by providing the seat availability diagram to the first user device;

receive, from the first user device, a response indicating an acceptance of any seat;

assign a seat in the vehicle to the first user device; and unlock an entry door when the vehicle reaches a pick-up location associated with a user of the first user device.

11. The system of claim 10, wherein the vehicle is an autonomous vehicle, and wherein the seat occupancy status comprises one of an occupant seated in a first seat in the autonomous vehicle or an object placed upon the first seat in the autonomous vehicle.

12. The system of claim 11, wherein the seat availability diagram includes a first symbol indicative of an unavailability of the first seat and a second symbol indicative of an availability of a second seat that is unoccupied.

13. The system of claim 12, wherein the at least one memory includes at least one of a first memory that is located in the autonomous vehicle or a second memory that is a part of a cloud storage.

14. The system of claim 13, wherein the second memory contains a seat arrangement template of the autonomous vehicle and the at least one processor utilizes the seat arrangement template to generate the seat availability diagram.

15. The system of claim 10, wherein the computer-executable instructions include a deep learning model that is utilized by the at least one processor to generate the seat availability diagram.

16. A method comprising:

capturing, by an imaging system located in a vehicle, at least one image of a seating area in the vehicle;

processing, a computer comprising one or more processors coupled to at least one memory, the at least one image to identify a seat occupancy status of one or more seats in the vehicle;

generating, based on the seat occupancy status, a seating diagram;

requesting that a passenger located in a first seat within the vehicle remove an object from a second seat within the vehicle;

modifying, based on the object being removed from the second seat, the seating diagram to include the second seat as an unoccupied seat;

receiving a request for a ride from a first user device;

providing the seating diagram to the first user device; and receiving, from the first user device, response indicating a selection of the second seat in the seating diagram;

assigning, the second seat in the vehicle to the first user device; and unlocking an entry door when the vehicle reaches a pick-up location associated with a user of the first user device.

17. The method of claim 16, wherein the vehicle is an autonomous vehicle, wherein the method further comprises processing at least one image of a seating area in the vehicle to generate a seat availability diagram, and wherein processing the at least one image of the seating area in the autonomous vehicle for generating the seat availability diagram comprises:

detecting an occupied seat in the autonomous vehicle; and providing, in the seat availability diagram, a first symbolic representation indicative of an unavailability of the occupied seat.

18. The method of claim 17, further comprising:

detecting an empty seat in the autonomous vehicle; and providing, in the seat availability diagram, a second symbolic representation indicative of an availability of the empty seat.

19. The method of claim 18, further comprising:

providing, in the seat availability diagram, a third symbolic representation indicative of an entry door located adjacent to the seat assigned by the at least one computer; and providing an instruction to a user of the user device to use the entry door for entering the autonomous vehicle.

20. The method of claim 17, wherein the seat availability diagram is generated at least in part by processing the at least one image using a deep learning model.

21. The method of claim 16, wherein processing the at least one image comprises:

obtaining, from cloud storage, a seat arrangement template of the vehicle; and using the seat arrangement template to generate the seating diagram.

* * * * *